(12) United States Patent
Elferich et al.

(10) Patent No.: US 7,076,206 B2
(45) Date of Patent: Jul. 11, 2006

(54) SYSTEM FOR WIRELESS TRANSMISSION OF ELECTRICAL POWER, A GARMENT, A SYSTEM OF GARMENTS AND METHOD FOR THE TRANSMISSION OF SIGNALS AND/OR ELECTRICAL ENERGY

(75) Inventors: Reinhold Elferich, Aachen (DE); Georg Sauerlaender, Aachen (DE); Thomas Duerbaum, Langerwehe (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 926 days.

(21) Appl. No.: 10/125,728

(22) Filed: Apr. 18, 2002

(65) Prior Publication Data

US 2002/0154518 A1    Oct. 24, 2002

(30) Foreign Application Priority Data

Apr. 20, 2001    (DE) ................................ 101 19 283

(51) Int. Cl.
*H04B 7/00*    (2006.01)

(52) U.S. Cl. ..................... 455/41.1; 455/282; 455/292; 363/20; 363/17; 363/95; 363/131; 290/55; 290/44; 219/629

(58) Field of Classification Search ............... 455/41.1, 455/282, 292; 363/20, 17, 16, 95, 131; 290/55, 290/44; 219/629
See application file for complete search history.

(56) References Cited

U.S. PATENT DOCUMENTS

| | | | |
|---|---|---|---|
| 5,412,253 A | * | 5/1995 | Hough .......................... 307/17 |
| 5,428,521 A | | 6/1995 | Kigawa et al. ................ 363/22 |
| 5,906,004 A | | 5/1999 | Lebby et al. ........................ 2/1 |
| 6,040,986 A | * | 3/2000 | Sakamoto et al. ........ 363/21.02 |
| 6,072,701 A | * | 6/2000 | Sato et al. ..................... 363/17 |
| 6,173,899 B1 | | 1/2001 | Rozin ......................... 235/492 |
| 6,278,210 B1 | * | 8/2001 | Fatula et al. ................. 310/112 |
| 6,288,919 B1 | * | 9/2001 | Jain ............................. 363/89 |
| 6,307,458 B1 | * | 10/2001 | Zhang et al. ................ 336/200 |
| 6,437,472 B1 | * | 8/2002 | Fatula et al. ................. 310/112 |
| 6,813,316 B1 | * | 11/2004 | Lohr ........................... 375/258 |
| 6,838,859 B1 | * | 1/2005 | Shah ........................... 322/38 |

FOREIGN PATENT DOCUMENTS

| | | |
|---|---|---|
| DE | 29712651 U | 11/1997 |
| EP | 0923182 A2 | 5/1999 |
| EP | 0957568 A2 | 11/1999 |
| EP | 0957568 A3 | 5/2000 |
| EP | 0923182 A3 | 4/2001 |
| WO | 9832217 A | 7/1998 |

* cited by examiner

*Primary Examiner*—Marceau Milord

(57) ABSTRACT

The invention describes a system for electrical transmission in the field of garments and a corresponding transmitter for this. Electrical circuits in garments are coupled, preferably inductively in a wireless manner with electrical devices and/or electrical circuits in other garments, wherein electrical energy is transmitted via the coupling. Energy transmission in both directions is preferably possible, wherein a distributed system results with sources and devices that can be coupled with each other. The efficiency of the inductive energy transmission is increased by regulation of the frequency, preferably using resonance. In addition, means for information transmission are proposed.

15 Claims, 7 Drawing Sheets

Figure 1:
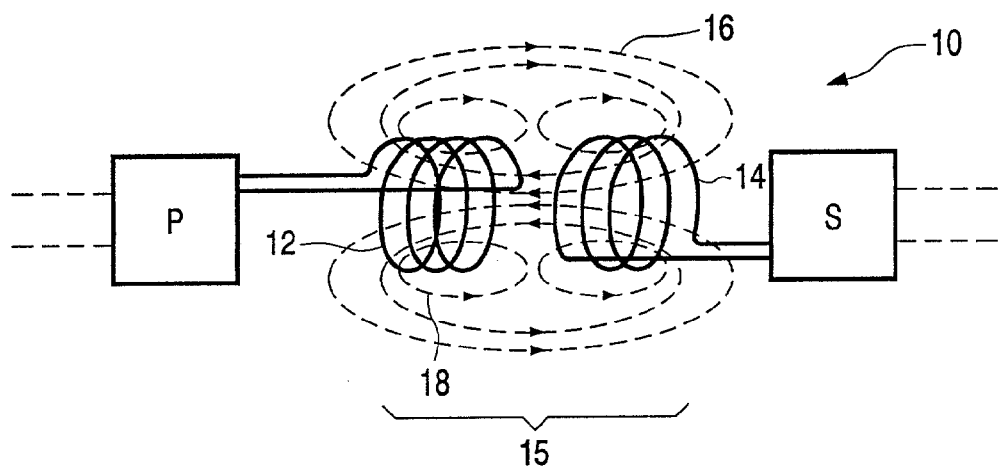

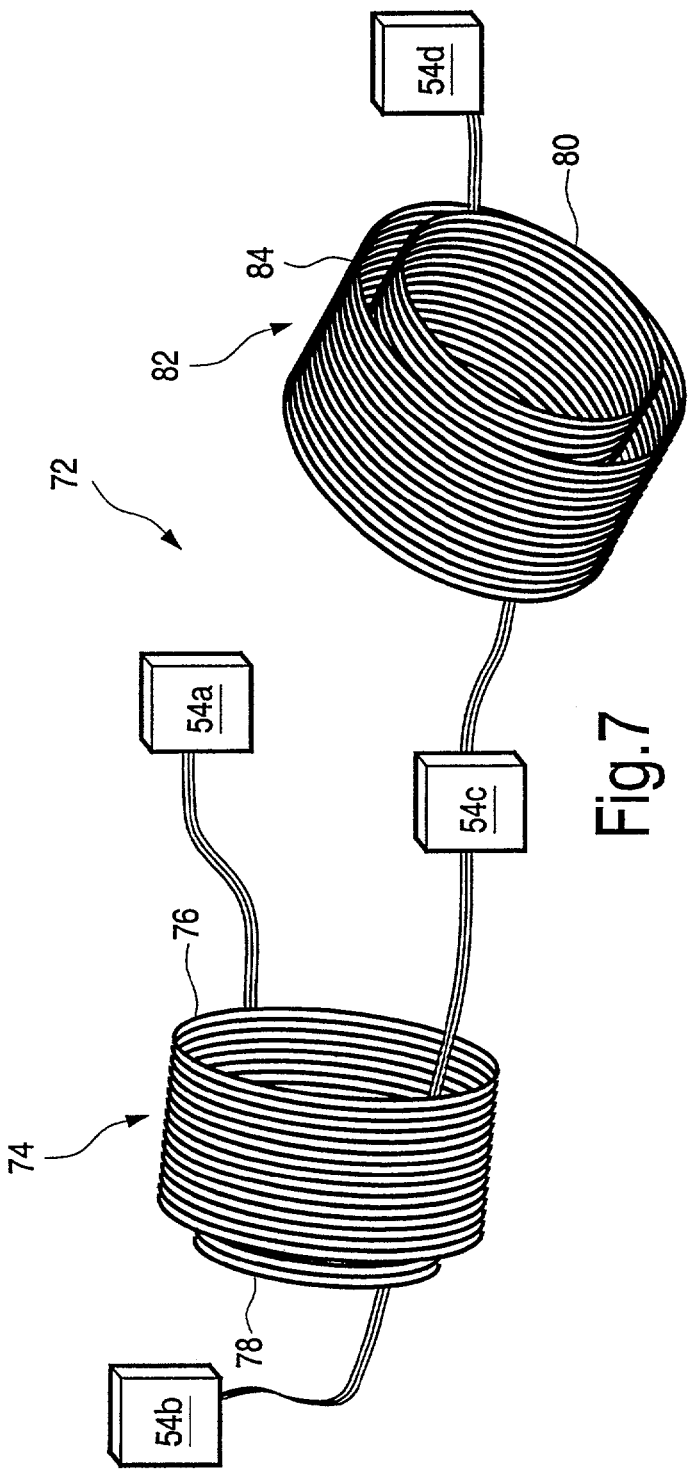
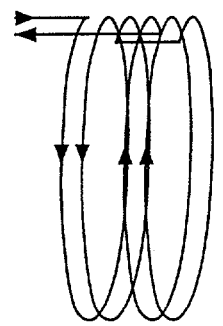
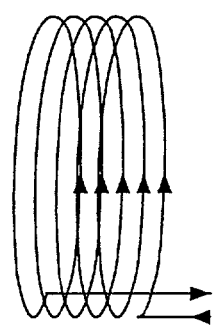

SYSTEM FOR WIRELESS TRANSMISSION OF ELECTRICAL POWER, A GARMENT, A SYSTEM OF GARMENTS AND METHOD FOR THE TRANSMISSION OF SIGNALS AND/OR ELECTRICAL ENERGY

The invention relates to a system for wireless transmission of electrical energy, a garment, a system of garments and a method for the transmission of signals and/or electrical energy.

Systems for wireless transmission of electrical energy and electrical signals are known. While signals for radio, for example, are consequently transmitted as electromagnetic alternating fields, even over long distances, for the transmission of electrical energy especially inductive transmission is known, which normally can only be used within a local range of up to 1 m. It is based on at least two magnetically coupled induction elements, for example coils. A first induction element, connected to a primary circuit, is driven by an AC voltage, so that a magnetic alternating field is generated. At least one second induction element, for example a secondary-side coil, is positioned in at least part of the electrical alternating field generated in this way, wherein by the change in the magnetic flux in the area enclosed by the induction element a voltage is induced on the secondary side.

The magnetic coupling is critical for the efficiency of such energy transmission. If, for example, parts of the magnetic field generated by the primary-side induction element do not run through the area of the secondary-side induction element, the coupling is incomplete and it is then a case of leakage flux or leakage inductance.

Transformers are widely used as systems for wireless transmission of electrical energy. In most conventional transformers the induction elements are arranged in a fixed and immovable manner in relation to each other, for example in a housing or on a mechanical retention system. The magnetic flux is passed through transformer cores and concentrated, so that only a smallest possible stray flux occurs. A totally different situation arises, however, if electrical energy is to be transmitted between two items where it is disadvantageous to couple these to each other in a mechanically fixed manner. In this case it is difficult to control and concentrate the magnetic field accordingly, so that stray losses frequently occur. The arrangement of the induction elements in relation to each other is frequently critical.

For example, U.S. Pat. No. 5,948,006 describes a system for transmission of electrical energy through the skin. A secondary induction element is implanted under the skin. An external primary induction element is placed externally on the skin and driven by AC voltage so that as a result of the inductive coupling electrical energy is transmitted to the secondary part. In order to achieve a most accurate arrangement of the induction elements in relation to each other and thus to guarantee a high efficiency of transmission, a display is provided that shows the correct positioning. On the secondary side the induced voltage is rectified and, for example, used to charge a battery. In addition, it is also proposed to transmit information by modulation.

A further system for wireless transmission of electrical energy is described in U.S. Pat. No. 4,692,604. In order to supply a smart card with electrical energy, induction elements are provided on both the card and the card reader so that these elements are magnetically coupled when the card is accordingly arranged in the card reader. The document assumes here that air-core inductors are insufficient for power transmission. Therefore, a flexible core of magnetic material is proposed.

U.S. Pat. No. 5,883,376 also describes a system for wireless inductive energy and data transmission. A primary-side antenna coil generates a magnetic alternating field, which induces a voltage there with a corresponding arrangement of the secondary-side coil. The secondary coil is arranged in a flexible element, to be used for marking and identifying an object. With the induced voltage a data memory is driven that allows a corresponding identification.

In the clothing area wearable electronics are playing an increasingly greater role. Here the trend is towards integration of electrical units into garments. This relates to on the one hand electrical devices such as mobile telephones, audio players, data memories, loudspeakers or headphones, computers, medical diagnostic devices, etc., and controls for them such as displays, keyboards, microphones, switches and so on. On the other hand, electrical energy stores are also involved. So, jackets have been proposed in which a mobile telephone and an audio player are integrated, wherein these electrical devices are secured in corresponding supports, such as pockets or other receptacles. Normally the devices can be removed if necessary. The devices are connected together by means of connection cables integrated into the jacket. The connection with the devices is by means of plug connectors and leads.

It is an object of the invention to improve the known garments such that electrical connections for electrical devices, energy stores or other electrical units are particularly easy to manufacture. It is a further object of the invention to improve prior-art systems for wireless transmission so that an efficient transmission is possible even with moving induction elements.

The object is achieved by a system for wireless transmission of electrical energy as claimed in claim 1, a garment as claimed in claim 10, a system of garments as claimed in claim 17 and a method as claimed in claim 18. Dependent claims refer to advantageous design forms of the invention.

In a system in accordance with the invention for wireless transmission of electrical energy two induction elements are envisaged, for example circuit loops, coils or other elements, that are able to generate a magnetic field. The induction elements are not arranged in a spatially fixed manner in relation to each other. They can, for example, be positioned in two completely separate objects; it is also conceivable for the induction elements to be arranged on objects that have a moving connection with each other, such as door and doorframe.

Here the first induction element is connected to a primary circuit and the second induction element to a secondary circuit. The designations for electrical circuits are initially selected here to be purely functional for the transmission of electrical energy from the first to the second induction element. As will be explained later, with a corresponding design the direction of the power transmission can be completely reversed wherein the second induction element is then arranged in the primary circuit and the first induction element in the secondary circuit.

For the transmission of electrical energy the induction elements must be positioned in such a way that they are magnetically coupled. This relates to above all the clearance between the elements. Theoretically the magnetic fields can stretch to infinity, in practice, however, it must be assumed that energy transmission will only be appropriate in the local range. Arrangements will be preferred in which the clearance of the induction elements is at a maximum in the range of their extension, and particular preference is for the clearance to be small with respect to the extension (for example, length). Thus the local range of the induction elements is utilized. It must, however, be ensured that the magnetic coupling does not depend on the clearance but also on the direction of the relative arrangement. Here the term magnetically coupled means only such an arrangement in which the leakage inductance of the resultant transformer is no longer great with respect to the magnetizing inductance. The ratio of the leakage to the magnetizing inductance is preferably in the range from 1:1 to 10:1.

When the primary induction element is driven with an AC voltage, with corresponding magnetic coupling in the second induction element, an AC voltage is induced. In accordance with the invention the AC voltage used on the primary side is adjustable. An expert will be aware of a number of circuits with which AC voltages of a desired frequency and waveform can be generated, including from a DC voltage supply. The term AC voltage is used here to mean not just sinusoidal voltage waveforms, but also any form of non-constant, at least approximately periodic, waveform. The invention is also not restricted to a certain frequency range. Thus energy transmission is possible even at low frequencies of from 50 Hz. Because of the losses, however, higher frequency ranges of a few kHz, such as 5–10 kHz, to well into the MHz range, are preferred. A high coil quality is achieved in air-core coils in the range from approximately 1 MHz upwards, for example.

Likewise the invention is not restricted to certain voltage ranges. For the applications in the area of garments r.m.s. voltages of approximately 40 V will preferably not be exceeded. The transmission ratio is, by way of example, 1:1, but in a specific application, depending on the voltage supply required, another ratio may also be found on the secondary side.

In accordance with a relevant further embodiment of the invention at least the primary circuit is designed as a resonant circuit. For this purpose, in addition to the induction element, at least one capacitor is envisaged, so that a resonant structure is created. With such a resonant structure in the area of a corresponding resonant frequency a desired increase in voltage on the induction element occurs, so that more energy can be transmitted via the inductive coupling. The adjustability of the supply voltage frequency allows specific use to be made of this resonance. Such a technique is known as a multi-resonant converter (here the term 'multi' means that more than two reactive elements are present and therefore also several natural frequencies). The reactive elements present are the capacitor and the inductances of the two induction elements. These can, for example, be represented in one of the prior-art equivalent circuit diagrams as various inductances (including one magnetizing and at least one leakage inductance). Thus a certain amount of leakage inductance is used here—for creating a resonant structure.

Here the basic consideration is for induction elements that are not mechanically fixed together to have a leakage inductance that differs according to length. The respective values of the magnetizing and leakage inductance(s) are decisive here in determining the resonant frequencies. A control is therefore desirable that, when the respective degree of magnetic coupling changes, and thus the resultant value of the magnetizing and leakage inductance, nevertheless controls the secondary-side voltage to a desired amount. The manipulated variable here is the primary-side excitation frequency.

Such control is particularly advantageous if the degree of the magnetic coupling is not constant over time. This can be expected, in particular, when a system in accordance with the invention is used in the field of garments where, through the movements of the wearer, the induction elements may move in relation to each other. As a result of this the resonant frequencies change also. This is taken into account by a corresponding control that measures the induced voltage on the secondary side and by changing the excitation frequency of the first induction element makes specific use of the increase in resonance. Thus a desired effectiveness of the energy transmission can be maintained even in the event of positional and locational changes of the induction elements in relation to each other.

This control can—directly or indirectly—determine and correct the respective degree of magnetic coupling. Her it is possible to use primary-side sending, meaning that it is exclusively from the primary side that the variables necessary for the control are determined. On the basis of the behavior of the primary-side input gate, when the conditions on the secondary side are known, corresponding magnetic returns via the coupling are possible.

It is, however, preferable in the secondary side to specify a setpoint for the voltage, determine a system deviation and transfer these to the primary-side control or correction unit. For this purpose, the various means explained below can be used for transmission, in order to transmit information on the magnetic coupling, the secondary-side voltage or the system deviation.

In accordance with a further embodiment, the voltage induced in the secondary circuit is rectified. This can take place using any rectifier devices known to an expert, in particular diode rectifiers. With diode rectifiers, however, the losses caused by the forward voltage of the diodes must be taken into account, which have clearly detrimental effects on the sometimes low induced voltages in the area of just a few Volts. Therefore, so-called synchronous rectifiers are preferred, namely clocked switches, which in each case by commutating to the current zeros, rectify the AC voltage, so that losses are minimized comparable to a forward voltage.

Semiconductor switches controlled by a control system are preferred for the synchronous rectifier. Such a circuit, however, is also suitable for generating in the primary circuit from a DC voltage supply the induction AC voltage with which the first induction element is driven. In accordance with a further embodiment of the invention it is therefore proposed to provide such controlled circuit arrangements both on the first and on the second induction element. With such an arrangement electrical energy can be transmitted both from the first to the second induction element and vice versa. The preference here is to design the circuit to be fully symmetrical, so that during transmission in both directions the same conditions apply. According to the direction of transmission the first or the second induction element can then operate as the primary circuit, wherein the clocked switches associated with it generate an AC voltage from a DC voltage supply. The other induction element is part of the secondary circuit, wherein the switch arrangement controlled there then operates as the synchronous rectifier.

As a further embodiment it is proposed to provide means for wireless transmission of information. The information to be transmitted involves the various signals. In particular transmission means for transmission of information (such as system deviation) can be used for control. If it can be assumed that the primary and secondary elements only move slowly, the magnetic coupling also changes only slowly, so that the information to be transmitted is narrow-band.

The transmission means include, for example, means for modulation and demodulation, with which the transmitted AC current is used as an information carrier. The use of radio transmitters and receivers is also conceivable. Because of the expected faults, transmission paths that are independent of the power supply are preferred, however.

This includes, on the one hand, inductive transmission via additional induction elements, that are orthogonal to the first and second induction elements. The term 'orthogonal' here means that the signals transmitted between the additional induction elements are essentially unaffected by the power transmission. Such independence can for example, on the one hand be achieved by having the additional induction elements sufficiently far removed from the first and second induction elements or these being screened. On the other, it is also possible to select such a geometrical arrangement that although the additional induction elements are applied in the vicinity of the first and second induction elements or are even directly superimposed on them, they are essentially not inductively coupled with these, wherein no significant field components of the alternating field running through the first and second elements run through the additional induction elements. One such possible solution is also an arrangement of the additional induction elements in which the field components of the first and second induction elements cancel each other out in the respective areas.

Alternatively, information transmission via a capacitive coupling is proposed. For this purpose sufficiently large areas are necessary, that are arranged so close to each other that a sufficient capacitive crosstalk takes place. If correspondingly large areas are arranged in the area of the alternating magnetic fields, eddy-current losses may, however arise, in particular at high frequencies. It is therefore proposed to form such surfaces where the eddy-current losses are minimized. Here a solution is preferred in which the surfaces consist of longitudinal areas that are electrically isolated from each other, wherein the areas on at least one end are electrically connected to one another so that, for example, a finger structure results. If such a structure is, for example, applied as printed conductors on a carrier surface, such structures can be arranged on both sides to overlap, so that essentially the function of a sealed surface results, but eddy-current losses are minimized.

The design of the garment in accordance with the invention is based on the knowledge that for the requirements and usage conditions that exist in the field of garments connections via cables and plug connectors are a disadvantage. On the one hand it is impractical, if each device first has to be connected to the electrical system of the garment. In addition, the plug connectors and cable ends experience a certain amount of wear. In particular, if various garments each contain electrical circuits that have to be coupled, plug connector systems are extremely impractical.

Therefore, a garment in accordance with the invention has a connection device for the wireless connection of electrical units. The term 'garment' here means any form of outfit that is worn—directly or indirectly—on the body, in particular outer clothing, headwear, shoes, belts, glasses, jackets, trousers, etc. Garments can be made from the most varied of materials, including plastic, leather, textiles, rubber and also metal.

Such a garment has, in accordance with the invention, a connection device for one or more electrical units. An electrical unit in this connection means the electrical devices and electrical energy stores mentioned above, but also other electrical circuits.

Here the garment itself has an electrical circuit, that in the simplest case can merely comprise a cable connection. Equally, the garment may have electrical units that have been integrated in advance in a fixed manner that are connected to its circuit, such as film-type, fixed, integrated energy stores or controls.

The connection device in accordance with the invention is connected to the circuit of the garment. Its purpose is to couple an electrical unit, which for its part is provided with a corresponding connection device. Here the coupling is wireless, wherein electrical energy and/or electrical signals can be transmitted. This has the advantage that the manual creation of a connection is no longer necessary, for example by plugging in a connector. No further exposed mechanical connections are present either that are subject to wear.

In accordance with a further embodiment the connection device is designed in such a way that it can create an inductive coupling to a corresponding device interface. For this it has at least a first induction element, for example a coil, a wire loop or another form of inductor that generates a magnetic field, if an electrical current is passing through it.

Of particular preference is also the provision of a receptacle to accommodate an electrical device, in which the device is mechanically retained. Since the inductive energy transmission is only sufficiently efficient in the local range, the combination of such a mechanical retainer with an induction element applied in the vicinity of this is highly advantageous. Here it is ensured that the induction element is positioned in such a way that the electrical device retained in the receptacle or its second induction element, respectively, is positioned in the range of the magnetic field generated by the first induction element, so that the two induction elements are inductively coupled. If the receptacle is, by way of example, a pocket or a strap, then the user can easily insert the electrical device in the pocket or strap. If the electrical device has a corresponding inductive device connector with a second induction element, then—according to the design of the induction elements or with a corresponding alignment of these—it is ensured that a sufficient magnetic coupling exists.

Other electrical units can be connected to the garment, including electrical devices and/or energy stores as well as other connectors for inductive coupling to corresponding mating components. Inside the garment these elements are preferably connected to electrical leads. These leads can, for example, be woven into the textile fabric of a garment, so that they form part of the garment. Similarly, leads can run on the inside of the garment or between two layers of textile. In this way the connections between electrical function elements do not interfere with the usage and are not subject to mechanical stress either.

The induction element is preferably mechanically flexible. For garments of rigid materials, such as the heels of shoes or the arms of glasses, this is unnecessary. In the case of textile garments, such as jackets, it is, however, particularly advantageous if a mechanically flexible inductor is used that behaves to a large extent like the textile material and so does not significantly affect the wearing characteristics of, for example, a jacket. Here the preference is for flat design forms, such as laminates in thin polyamide layers with conductive metal layers. Copper layers, for example, with a thickness of 10–50 µm, preferably around 35 µm, are suitable for this purpose. Here the most varied of induction structures can be formed, including closed rings (coils) and open structures. For example, in the area of a pocket or around the sleeve of a jacket closed coils, for example in the form of axial-field windings or axial-radial-field windings, may be used. Open structures that do not necessarily form a ring, in which the magnetic field hereby generated is concentrated, include for example radial-field windings. Corresponding structures are presented by means of the design example.

A garment in accordance with the invention can be part of a system, in which electrical energy is to be transmitted in a wireless manner between two garments. Here the connectors, preferably induction elements, are arranged in a particular way so that transmission can take place when two garments are worn at the same time. This is advantageous if the efficiency of the transmission is dependent upon the relative positioning of the connectors, in particular the clearance. This is the case with inductive energy transmissions. In accordance with the invention, use is made here of the fact that garments are largely worn in specific places on the human body. Thus the relative positioning of two garments, such as shirt and trousers or a jacket worn over a jumper, is to a large extent fixed. Thus it is possible to select points on the garments that in the wearing position of the garment have such a positioning in relation to each other that the connectors arranged here allow the transmission of energy. For example, for the inductive energy transmission from a jacket to a jumper worn beneath it, the arms of the two garments, worn coaxially one inside the other, can be used. Coils, the windings of which are arranged in a set position, for example in the middle of the arm or even over almost the entire length of the arm, necessarily have a high degree of magnetic coupling. A number of other transfer points are likewise conceivable, such as between shirt and trousers, collar and glasses, trousers and shoes, etc.

Figure 2:
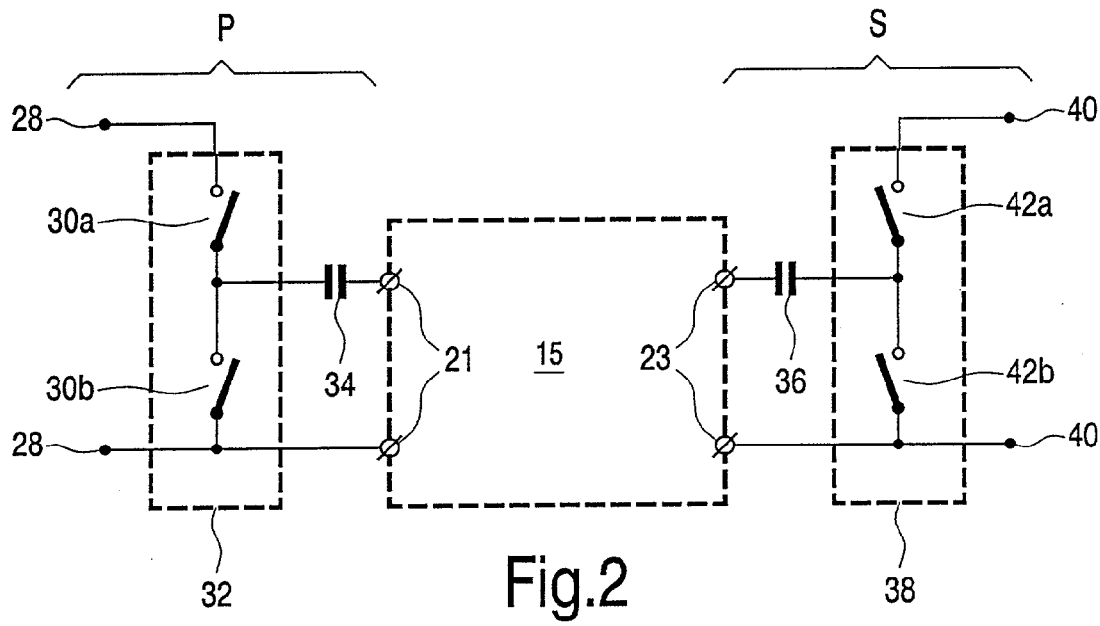
Figure 2A:
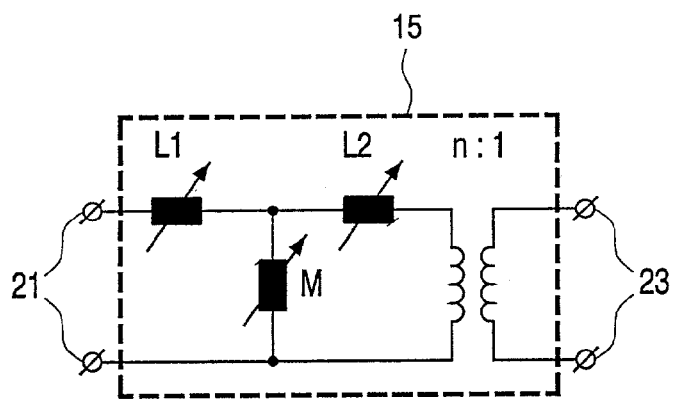
Figure 3:
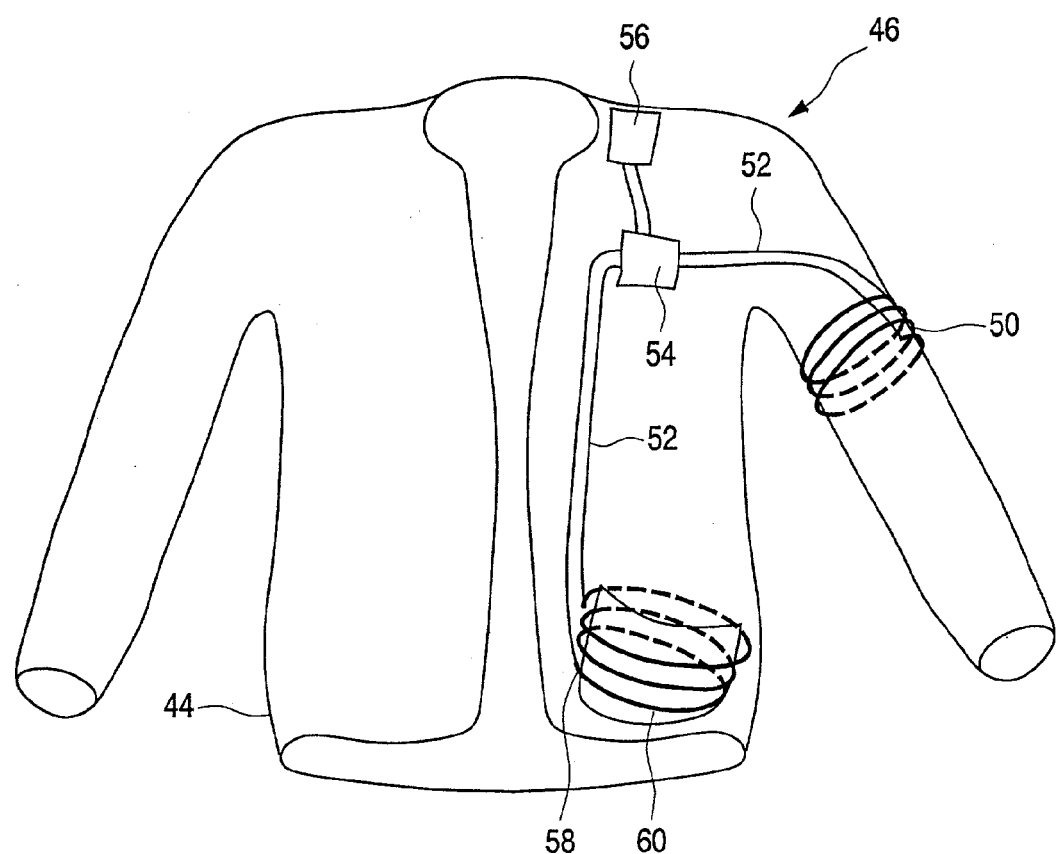
Figures 4, 5:
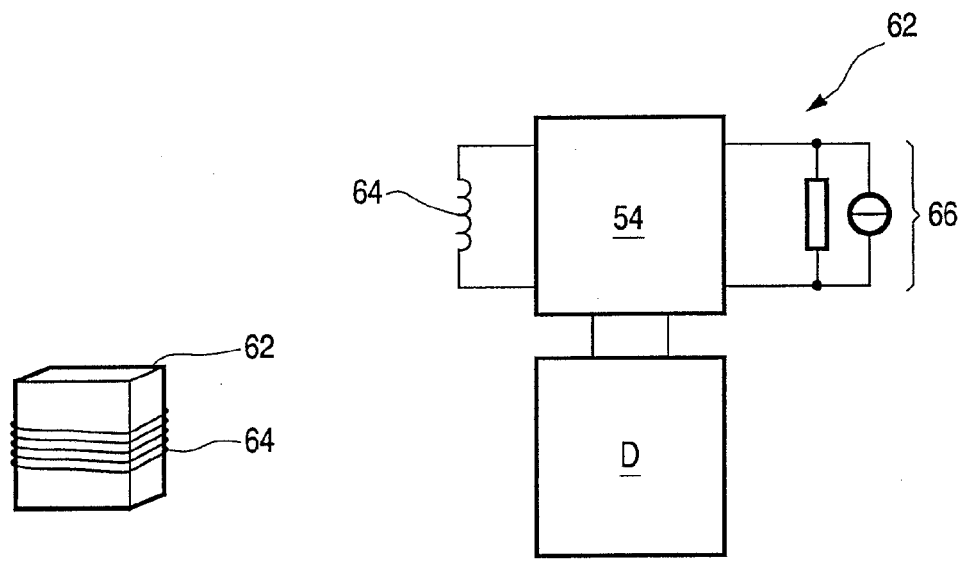
Figure 6:
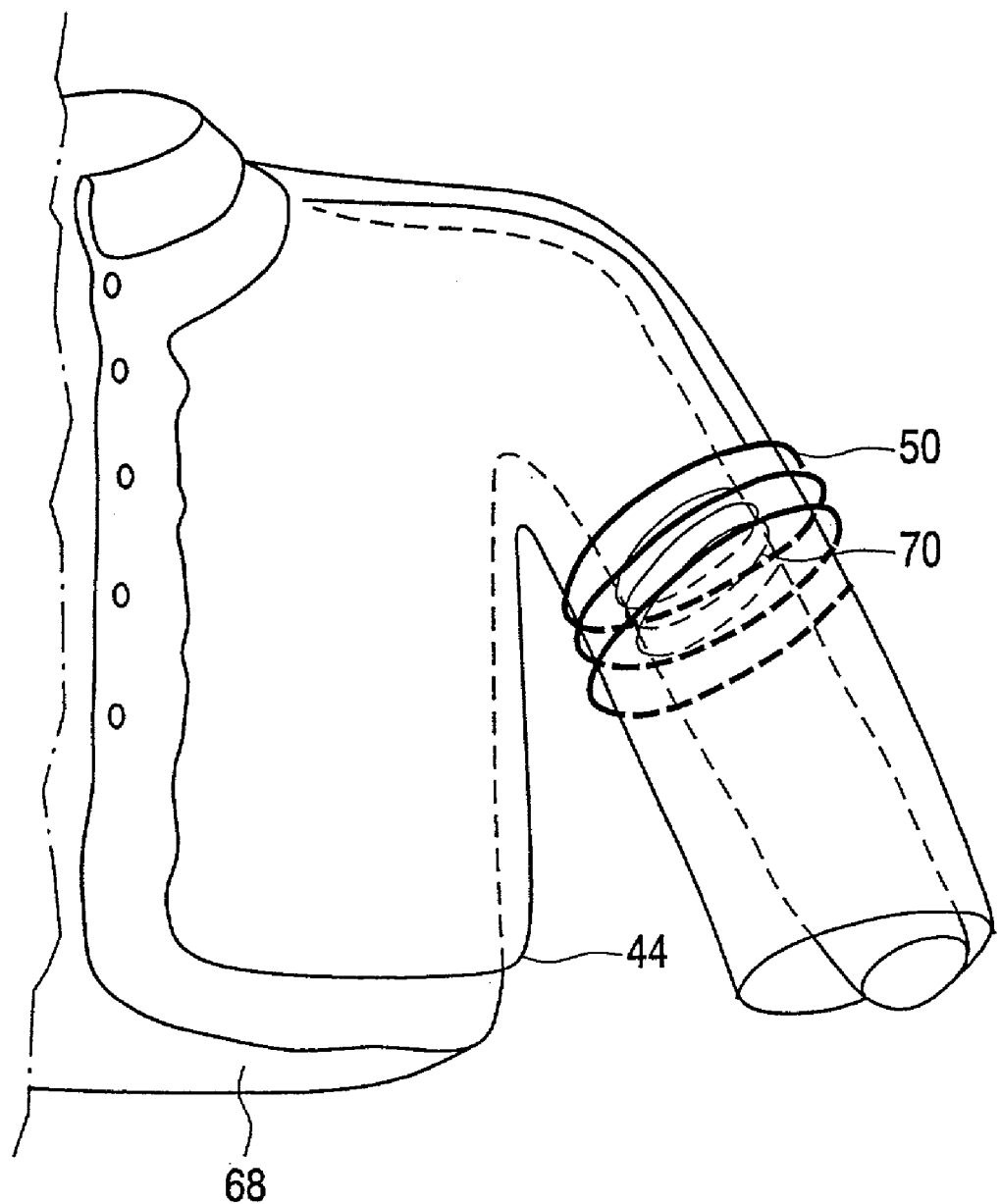
Figure 10:
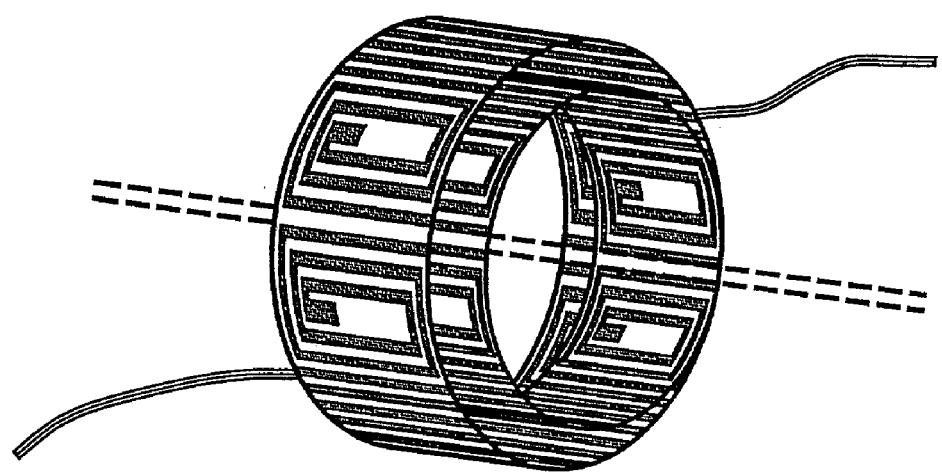
Figure 11:
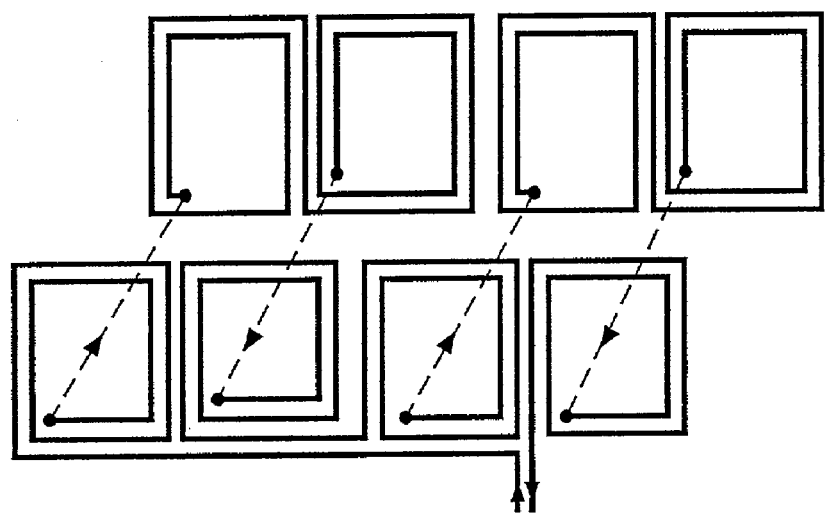
Figure 12:
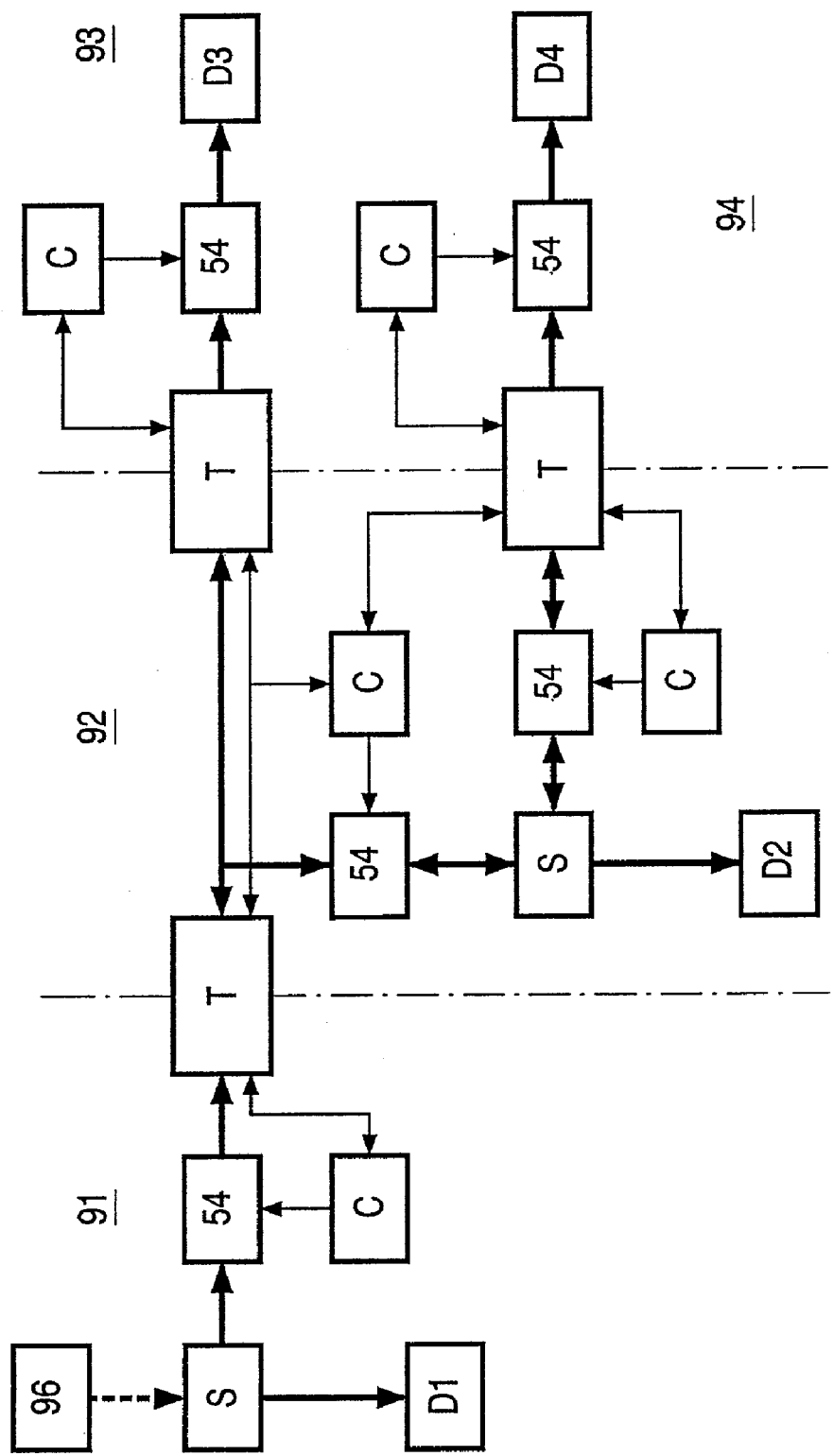
Figure 13:
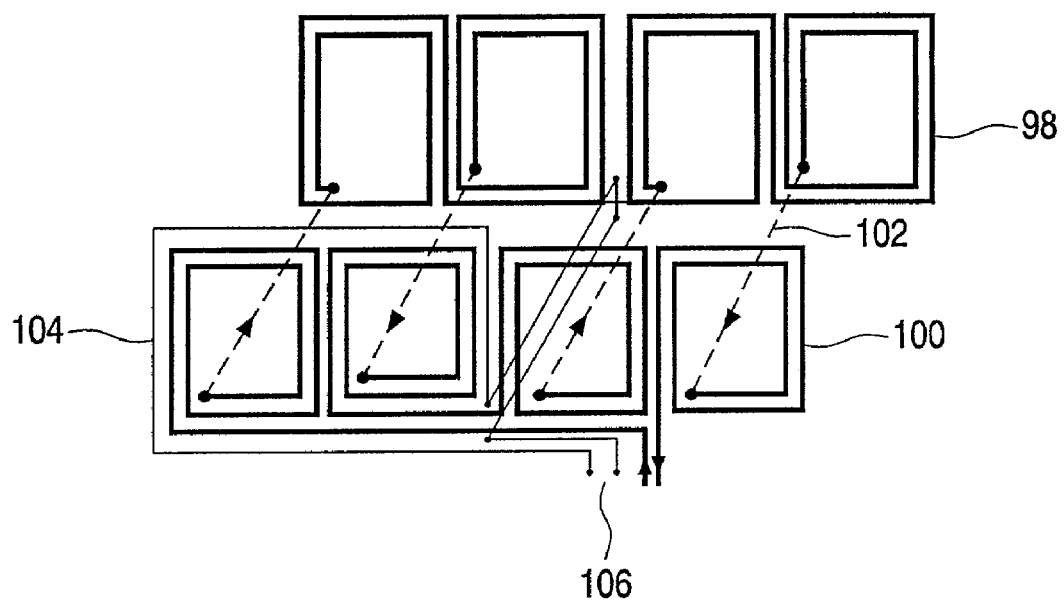
Figure 14:
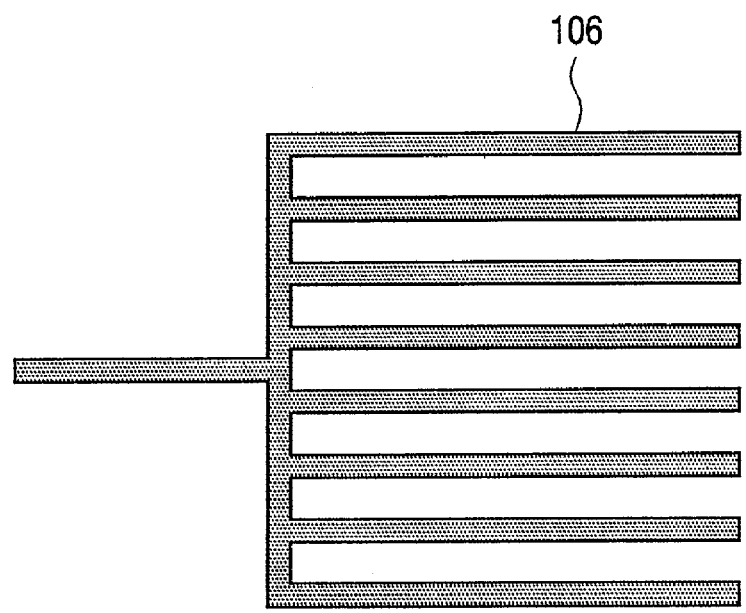

In the following the invention is described in more detail using the drawings, which show in:

FIG. 1 a symbolic representation of a transmission system with two induction elements;

FIG. 2 a circuit diagram of the transmission system;

FIG. 2a an equivalent circuit diagram of a transformer;

FIG. 3 a garment with an electrical circuit and inductive connectors;

FIG. 4 an electrical device in a symbolic, perspective representation;

FIG. 5 a block diagram of the device shown in FIG. 4;

FIG. 6 two garments with a transmission system;

FIG. 7 a perspective view of the induction elements of a transmission system;

FIG. 8 an axial-field winding;

FIG. 9 an axial-radial winding;

FIG. 10 a transmission system of radial-field windings;

FIG. 11 an embodiment of the topology of the radial field windings of FIG. 10;

FIG. 12 a symbolic representation of the elements of a transmission system;

FIG. 13 an embodiment of the topology of an axial-field winding with orthogonal winding for transmission of information;

FIG. 14 a finger structure of a capacitive coupling surface.

FIG. 1 shows a transmission system 10 for inductive transmission of electrical energy. A primary circuit P with a primary induction element 12 is connected with a secondary circuit S with an induction element 14. The symbolically represented induction elements 12, 14 constitute a transformer 15. They are arranged close together and are aligned with each other in such a way that they have a magnetic coupling, meaning that the magnetic field 16 generated by the primary induction element 12 is enclosed as far as a leakage field 18 of the secondary induction element 14. Corresponding physical representations for the induction elements and their fields that are referred to only in a symbolic manner here are described in connection with FIGS. 7 to 11. The transmission ratio is preferably 1:1.

FIG. 2 shows a circuit diagram of the transmission system shown in FIG. 1. The transformer 15 is shown here with four poles with primary terminals 21 and secondary terminals 23. FIG. 2a shows—as one of the possible equivalent circuit diagrams—the T equivalent diagram of a transformer. The choice of equivalent circuit diagram is arbitrary and of no further significance. Any equivalent circuit is suitable that has an equivalence to the physical arrangement with respect only to the clamping behavior. The induction elements 12, 14 are represented here by a magnetizing inductance M (which originates from the part of the magnetic field 16 that runs through both induction elements). The leakage components 18 of the magnetic field are represented as primary leakage inductance $L_1$ and secondary leakage inductance $L_2$. These inductances $L_1$, $L_2$ are shown as variable elements, since their relative position changes when there is a change in the relative positions of elements 12, 14.

The primary circuit P is supplied on terminals 28 with a DC voltage. A chopper unit 32 has circuits 30a, 30b, with which the input DC voltage is transformed between the terminals 28 into an AC voltage. The chopper unit 32 can be designed in a number of ways known to an expert to suit the requirements in each case. Here field-effect transistors (MOSFETs) are used that are controlled by a controller (not shown here). In order to generate an AC voltage these periodically reverse with a frequency that is specified by the controller.

The AC voltage generated via the chopper unit 32 drives the serial resonant circuit formed in the primary circuit by a capacitor 34 and the inductances $L_1$, M and $L_2$. Through the resonant arrangement, for rectangular excitation also, partially sinusoidal waveforms result. With a serial resonant circuit in the area of the resonant frequencies a strong increase in voltage takes place at the inductances. This increase in voltage is used in order to specifically control the transmission of energy via the coupled inductance 11 from the primary to the secondary circuit.

The arrangement here is such that the system basically works in a frequency range that is above the resonant frequencies. This can be checked from the primary side by observing the behavior of the gate on the primary-side terminals 21. If this behaves in an inductive manner, then it can be concluded that above critical excitation, i.e. above the resonant frequencies, is taking place. If it has a capacitive behavior then it is the range below the resonant frequencies that is involved.

If operation basically takes place at above-resonant frequency, the control can easily react to a drop in the secondary-side voltage by dropping the primary frequency. In this way it is possible to approximate to the resonant frequency, so that a stronger voltage rise takes place and the secondary voltage increases. Conversely, the secondary-side voltage can be lowered by increasing the primary-side frequency thus moving further away from the resonant frequency.

By coupling the inductance M an AC voltage is induced in the secondary circuit S. The secondary circuit S also has a capacitor 36. The voltage over this capacitor and the inductances is fed to a synchronous rectifier 38. The synchronous rectifier 38 has switches 42a, 42b that rectify the AC voltage. This takes place by the switches 42a, 42b each being closed only in the reversal, wherein the commutation to zero current takes place. Unlike diode rectifiers, synchronous rectifiers work without forward voltage. The output voltage on the terminals 40 of the synchronous rectifier 38 is a—though highly pulsating—DC voltage. So overall from the terminals 28 to the terminals 40 electrical energy is transmitted in the form of a DC voltage via an inductive coupling between two induction elements 12, 14. The output voltage in the terminals 40 can if necessary also be smoothed.

Synchronous rectifier 38, like the chopper unit 32, has controlled switches. For synchronous rectifier 38 also a control—not shown here either—is provided that operates the switches 42a, 42b in such a way that the element 38 operates as a synchronous rectifier. Overall therefore the entire arrangement has a symmetrical design, meaning that the primary and secondary sides each include controlled switches that are connected to a serial resonance circuit. Therefore with this arrangement and a corresponding design of the control, electrical energy can be transmitted both from the terminals 28 to the terminals 40 and in the opposite direction. When energy is transmitted in the opposite direction the control operates the unit 38 so that the switches 42a, 42b work as choppers, while the control of unit 32 controls the switches 30a, 30b in such a way that the working method of a synchronous rectifier is the result. Here it has proven advantageous also to design or dimension the induction elements 12, 14 and the capacitors 34, 36 in the same way, but this is not absolutely essential.

The actual numerical values for the component values of the elements of the system shown in FIG. 2 and for the operating voltages and frequencies depend upon the respective use and may differ considerably.

FIG. 3 shows a garment 44, in which an electrical circuit 46 is integrated. The electrical circuit 46 has connectors 48, 50 that are integrated in a fixed manner into the garment. Within the garment leads 52 belonging to the circuit 46 are also run, that connect the connectors 48, 50 with a power supply module 54. The power supply module 54 is connected by leads to an electrical device 56 connected in a fixed manner to the garment 44, in this case a mobile telephone attached to the collar.

The connector 48 comprises coil windings 58, that run around a receptacle, in this case a pocket 60. The connector is used for inductive coupling of the circuit 46 to a transportable electrical device 62 contained in the pocket 60, which is shown symbolically in FIG. 4. The device 62 can be an audio player, a pocket calculator, a mobile telephone, a data store, a navigation device, a medicinal dosing unit or other portable device, that is operated by electrical energy. The electrical device has a coil 64 that runs around the housing and which is used for the inductive coupling.

As shown in FIG. 5, the device 62 has a functional unit D, which is the actual functional unit of the electrical device 62. The device 62 also has a power supply 66, for example a battery or an accumulator, that is shown here as the voltage source. These units and the coil 64 are connected to the power supply module 54.

When the device of FIG. 4 and FIG. 5 is correctly positioned—in this case upright—in the pocket 60 of the jacket 60, then a transmission system results as explained above in relation to FIGS. 1 and 2 from the magnetic coupling of the coils 48, 64. The circuit 46 is in this case inductively coupled with the device 62. The additional electrical elements, that is the switch units 32 or 38, capacitors 34 or 36 and the necessary control are contained in the power supply modules 54.

Here the pocket 60 is dimensioned in such a way that only a correct positioning—namely upright—of the specific wearable device 62 is possible.

Overall, therefore, a distributed system results within the garment 44, within which the device 56 that is integrated in a fixed way in the jacket is coupled with the device 62 accommodated in the pocket 60. It is now possible to both transmit energy from the source 66 of the device 62 to the device 56 and vice versa. During the transmission of electrical energy from device 62 to device 56 the power supply module 54 and the source 66 draw electrical energy in the form of a DC voltage. By means of chopping an AC voltage is generated, with which the coil 64 is operated. In the coil 58, that operates as a secondary induction element and that is magnetically coupled with the coil 64, an electrical AC voltage is induced. This is rectified in the power supply module 54 of the garment 44 and transmitted to the device 56. Thus the device 56 can be fed from the source 66 of the device 62.

The garment 44 also has a further connector 50, which in this case is designed as a coil that is arranged at a particular point on the arm of the jacket 44 so that the coil windings run around the arm. The connector 50 is used for coupling to a further garment. The resultant system of two garments 44, 68 is shown in FIG. 6.

The jacket 44 of FIG. 3 is shown here, as worn over a shirt 68 on the body of a person—not shown here. Both garments have electrical circuits—not shown here. On both garments at the same point of the arm of each a coil 50, 70 is attached each of which are connected to the electrical circuits. When the two garments are arranged on the body of the person in the normal way, the arrangement from FIG. 6 results, in which the coils 50, 70 are positioned coaxially inside each other, so that they have a high degree of magnetic coupling. The winding ratio of the coils is preferably 1:1. Here advantage is taken of the fact that the position of the respective point of the arm when the two garments are worn properly—here shirt and jacket—is known relatively accurately. This also applies to a large number of other pairs of garments, such as trousers/belt, etc.

The two garments 44, 68 from FIG. 6 form a system of garments, wherein electrical energy can be transmitted inductively from one garment to another. With such a transmission system in the clothing area, because of the arrangement that can never be fully determined in advance, a certain amount of leakage inductance will always occur, so that it is particularly advantageous here to create a transmission system as shown in FIGS. 1 and 2 that takes advantage of a resonance.

Both the transmission between two garments 44, 68 from FIG. 6 and the transmission of electrical energy between the device 62 and the garment 44 from FIG. 3 are subject to certain fluctuations here. These are the result of the wearer of the garments moving, making the garments slip against each other or the device 62 slip slightly inside the pocket 60. This has effects on the value of the leakage inductances $L_1$, $L_2$ and the main inductance M as shown in FIG. 2a. Therefore, a control—not shown here, is envisaged that adapts the energy transmission to the degree of magnetic coupling that changes over time. Therefore, at regular or irregular intervals the voltage on the secondary side is measured and compared with a setpoint. When there is any deviation, the excitation frequency is varied so that it is closer to the resonant frequency, that is the frequency at which the voltage increase on the main inductance 20, 22 is at a maximum. The switch units 32, 38 with their switches 30a, 30b, 42a, 42b are operated in such a way that the secondary voltage is regulated at the desired value. Here an adaptation at intervals of, for example, 200 ms to 10 s can take place, with an adaptation approximately every second being preferred. The system deviation determined on the secondary side is transmitted with means that are not shown here but which are detailed below to the control unit of the primary circuit, so that this control unit can adapt the frequency accordingly and thus regulate the voltage.

FIG. 7 shows the elements of a transmission system 72 in a perspective view. A first transformer 74 is in the form of an outer coil 76, in which an inner coil 78 is housed. The outer coil 76 is connected to a power supply module 54a. The inner coil 78 is electrically connected with power supply modules 54b, 54c as well as with an inner coil 80 of a further transformer 82. The second transformer 82 also has an outer coil 84 which is connected with a power supply module 54d. The coils 76, 78, 80, 84 are axial-field windings, the topology of which is shown once again in FIG. 8. The transformers 77, 82 are in the form of coils 76, 78; 80, 84 that do not have a fixed connection with each other but which can move freely in relation to each other. Here the coils can be affixed to items—not shown here—that are separate from each other such as jacket or shirt sleeves (see FIG. 6).

The coils are made of mechanically flexible elements, in which thin copper layers are applied to a flexible plastic strip. Copper tracks of 35 µm in thickness are involved. The element overall is very flexible so that it is easy to join to textiles, without the wearer of a corresponding garment noticing any interference.

The system shown in FIG. 7 has four power supply modules 54a, 54b, 54c, 54d. Electrical energy in the form of AC voltages is transmitted between these power supply modules. This could be referred to as a type of power bus. The power supply units 54a to 54d are built like circuits P and S from FIG. 2, meaning that they can take electrical energy in the form of AC voltage and convert this into DC voltage, with which devices (not shown here) that are connected are driven. Equally the power supply modules 54a to 54d can also work as a primary-side circuit P, wherein they draw electrical energy from a connected energy store, such as a battery or accumulator (not shown here), as a DC voltage and convert it into an AC voltage, which is transmitted via the power bus. Here the power supply modules 54a to 54d have control units that control corresponding switches 30a, 30b, 42a, 42b. When an AC voltage is generated—as described above—a frequency is used such that the secondary voltage is regulated around a setpoint.

A special role is played by module 54c. This comprises two separate circuits P or S, which are each connected to different transformers 74, 84. The system can, for example, be operated with a source coupled to module 54b (such as a battery) and consumers (such as audio players and mobile telephones) that are coupled to the modules 54a and 54d. Then energy is transmitted from module 54b to modules 54a, 54c via the transformer 74. Module 54a rectifies the secondary-side voltage and supplies the consumers from this. The module 54c converts the corresponding AC voltage into an AC voltage of another frequency, with which the transformer 82 is operated and thus the energy is transmitted to module 54d.

FIG. 9 shows by way of an alternative winding topology, an axial-radial-pole winding with two field windings. Unlike the axial-field-winding in accordance with FIG. 8, where the magnetic field runs axially in the center of the coil, within the coil topology in accordance with FIG. 9, at the core center a radial magnetic field running outwards is formed. Just like two coils with axial-field-windings, two coils with radial-field-windings can also be brought into mechanical coupling by arranging these coaxially to each other. The axial-radial-field winding here is significantly more sensitive to axial displacement, however. With the inductive coupling of two elements, in which an axial displacement has to be envisaged, a winding topology in accordance with FIG. 8 will therefore preferably be used.

As an alternative to the closed structures in accordance with FIGS. 8 and 9, in FIGS. 10 and 11 an open structure of an induction element is show. This is a multi-pole radial-field-winding here having four poles. A design with a double-sided copper-clad flexible printed circuit board is also shown here, wherein the broken lines represent through-contact points. Two such induction elements with matching structures are positioned in order to create an inductive coupling in such a way that the pole windings are facing each other. With respect to the positional tolerances of both elements a pole winding must be designed in such a way that an axial (or in the stretched case a vertical) displacement is less than the pole winding height and a twist (or in the stretched case a horizontal displacement) is less than the pole winding width. The axial field winding in accordance with FIGS. 10 and 11 can actually have a closed structure, meaning that a ring is formed as shown in FIG. 10. The elements, however, cannot also be arranged in elongated form facing each other without a closed ring resulting. Thus corresponding induction elements in the clothing area can above all be used wherever no closed ring can be guaranteed, for example on a shirt collar or a belt.

FIG. 12 shows a schematic representation of a distributed system of four garments 91, 92, 93, 94, wherein the areas of the respective garments are separated by dash-and-dot lines. The garments 91, 92, 93, 94 each have electrical devices D1, D2, D3, D4. In the garments 91 and 92 electrical energy sources S are also present. The electrical devices can be any electrical devices. Corresponding examples have already been given above.

The sources S of the system can be energy sources connected to the devices, for example batteries or accumulators provided for in the device housing. Likewise, within the garments, separate energy stores—not shown here— could be provided that have a fixed connection with the garment. This is useful above all for rechargeable energy stores such as accumulators or high-capacity capacitors. Depending on the garment such elements may have different forms. While for textile garments flat, to the greatest extent mechanically flexible, elements such as film-type accumulators are appropriate, in the heels of shoes, for example, normal shaped accumulators can be used.

The system in accordance with FIG. 12 has at some borders between the garments 91, 92, 93, 94 transformers T. These are pairs of coupled induction elements, as already described extensively above. The transformers T are each operated on the primary and secondary side by a power supply module 54 that is controlled by a control unit C.

In the representation of FIG. 12 the bold arrow shows the transmission of electrical energy, while the thin arrow shows the flow of electrical signals for information purposes. The transmission of information signals likewise takes place in a wireless manner via the transformers T. In connection with FIGS. 13 and 14 the devices and method used here are covered in more detail below.

Information is transmitted here between the control units C, which control the power supply modules 54, respectively. These control units are designed as microprocessor controllers. The control units C perform the control described above. Here the unit C in a pair under consideration on the secondary-side measures the secondary-side voltage and determines a system deviation. This is—preferably in digitized form—transmitted as information via the transformer T to the primary-side control unit C.

The primary-side control unit then performs the actual regulation, that is to say, it adapts the manipulated variable (primary frequency) as described above in such a way that the controlled variable (secondary-side voltage) reaches the setpoint. Here the various types of controllers (P, PI, PID, etc.) sufficiently known to the expert can be built.

In addition, the microprocessor control units C, that have a communications link with each other are also used in order to control the distribution of electrical energy in the connection set up. For this purpose, they execute a program with which overall an energy distribution concept is achieved throughout the system. This can take various forms. In the form here the intention of the overriding concept is to ensure that the units present D1, D2, D3, D4 are supplied with sufficient electrical energy so that their function is guaranteed. In addition the respective sources S are provided with an identifier in the garments 91 and 92, that indicates the respective priority of the source, wherein sources with higher priorities are drawn on first for electrical energy and sources with lower priorities only take over the energy supply if other sources have failed. For example, expensive, non-rechargeable batteries can be used as an emergency reserve so that in normal operation electrical energy is then drawn from another rechargeable source (with higher priority) that is available within the system. The control units C exchange their corresponding information via a suitably defined protocol so that the system is organized in accordance with the specifications. In the case shown in FIG. 12, the devices D3 and D4 in the garments 93 and 94 are therefore jointly supplied via the corresponding transformers T from the sources S in the garments 91, 92. Here the DC voltage supplied by the sources S is converted in the power supply modules 54 into AC voltage that is transmitted to the garments 93 and 94 via the transformers T. The devices and methods used here, which take into account the particular situation of transmission of electrical energy between garments that are not fixed in relation to each other, have already been explained above.

Devices D1, D2, D3, D4 can have further devices for adapting the supply voltage, for example in-phase regulators or DC/DC converters.

FIG. 12 also shows how the rechargeable source S in the garment 91 is charged from an external charger. The rechargeable source S which, for example, is an accumulator with a design of a prior art, can of course be charged using a charger of a prior art, wherein the charger 96 is connected by means of the plug connection with the source. If, however, the charger is secured in a fixed position within the garment, thus for example if an accumulator with a design of a prior art is housed in the heel of a shoe or a flat, flexible accumulator is contained in the lining of a jacket, here also a wireless connection of a charger is preferable. For this purpose the systems described above for inductive power transmission can be used, wherein one, some or all sources in a garment are charged through the creation of the inductive coupling and energy is transmitted from the charger to the sources. This can take place without the sources being removed from the garment. The sources are, by way of example, charged by hanging the jacket over an inductor in the shape of a coat hanger, wherein the jacket, by way of example, has corresponding secondary induction elements on the shoulder pieces, to which the coat hanger inductor transmits electrical energy. The sources present in the jacket—and possibly also external sources, for example an electrical device 62 accommodated in the pocket 60—are then charged, wherein the control units C as necessary ensure that the electrical energy is distributed to all sources to be charged. This special form of inductor, which can also be used as a storage device or holder for the garment, allows a particularly user-friendly usage of such a method for charging the sources. Here other designs for the inductor are also conceivable, for example as a shoe tree which with a secondary induction element mounted in the shoe forms a transformer in order to charge a source in the heel of the shoe.

In the distributed system organized by communication between the control units C in accordance with FIG. 12, it is also possible for energy to be drawn from a source with a higher priority in order to charge other sources.

Alternatively, charging of the source using a method with parasitic power acceptance is also conceivable, in which, for example, mechanical movements, that the garment experiences as a result of movements by the user or his body heat, are used to win energy. Apart from this it is possible to use solar cells for the energy supply.

As already mentioned a number of times, the transformers can transmit not only electrical energy for energy supply, but also electrical signals for transfer of information. This can on the one hand be information that is sent and received by the control units C and is used for organization of the distributed system from FIG. 12. On the other hand, however, information can also be exchanged between the devices of the system, for example data from a mobile phone to an organizer, or audio signals of an audio player to a headset integrated into the collar of the jacket. In particular—as described above—it is particularly useful to carry out the regulation of the excitation frequency for the respective primary induction element via a means for transfer of information. Thus the secondary circuit can transfer the measured value for the respective induced voltage or the system deviation form a setpoint in the primary circuit, so that the primary excitation frequency can be adjusted accordingly.

The transmission of information likewise takes place in a wireless manner, preferably to the same points to which the energy transmission also took place. Here very different devices and methods can be used. Firstly a corresponding modulation of the supply voltages transmitted via the transformers T is possible. Here on the primary side a corresponding modulator and on the secondary side a corresponding demodulator are envisaged. Because of the variable magnetic coupling, in particular at a regulated transmission frequency, however, very strong interference may be expected, so that this solution will only be used in a very few suitable cases. Another possibility for signal transmission is represented by radio transmission. Because of the possible interference and the switching excursion, however, this is again not a preference.

Information transmission is therefore proposed either via an additional inductive coupling or a capacitive coupling. In an additional inductive coupling additional induction elements on the primary and secondary sides that are specially intended for information transmission are provided for. These are designed or arranged in such a way that the information transmission is independent of the energy transmission and the fewest possible faults occur.

This can be achieved by a special design of the induction elements. For example, when an axial-field-winding in accordance with FIG. 8 is used for the energy transmission and an axial-radial-field winding in accordance with FIG. 9 for the information transmission, the respective fields generated from these are largely independent, so that the two transmissions affect each other only slightly. Other combinations of orthogonal inductor topologies will be known to the expert.

A further possibility is shown in FIG. 13. This is the four-pole radial-field-winding from FIG. 11, in which on both sides of a wearer the radial-field windings 98 on one and 100 on the other side of the wearer are attached. Through-contacts 102 connect the radial-field-windings 98, 100. For the purposes of data transmission, a winding likewise created on the wearer 104 is used, that has its own terminals 106 and is fully electrically insulated from the windings 98, 100, but which spatially is superimposed. Here the winding 104 includes two of the four-pole windings 100, wherein within the surface contained the contributions of the enclosed pole-windings that are wound in the respective opposite direction almost completely compensate for each other. The magnetic field generated by a current flow through the windings 98, 100 thus has no or only a very small portion within the area enclosed by the additional winding 104. Thus the winding 104 can be used for transmission of electrical signals that is largely unaffected by the inductive energy transmission. Such orthogonality is not of course restricted to the arrangement shown in FIG. 13, but can also be created for very different structures, in which for example different distances between pole centers for the power transformer on the one hand and the signal transmission transformer on the other can be selected.

Another possibility that is proposed for the transmission of electrical signals is a capacitive coupling. This can, by way of example, comprise a metalisation strip above and/or below the windings for the energy transmission, that are provided on both the primary and secondary sides. These two metalization strips thus form a long parallel printed conductor with a correspondingly high capacitive crosstalk. While such an arrangement is undesirable in conventional layouts, the effect of the capacitive crosstalk can be usefully employed here for data transmission.

The capacitive coupling can in principle be created via a surface of any shape, wherein in each case at least one surface is provided on the primary and secondary sides and the surfaces with a low clearance—up to 10 cm, preferable less than 3 cm, particularly preferred less than 1 cm—overlap at least in part. The electrically conductive surfaces can be advantageously formed as metal surfaces, which should however be insulated from each other. It is advisable to arrange these surfaces in the vicinity of the power transformer, but in any case it should then be ensured that any eddy-current losses in metal surfaces are minimized within a magnetic field. On this point FIG. 14 shows an inter-digital structure for a capacitive coupling element with longitudinal areas 106 that are insulated from each other along their length. These can be applied as a metal layer to a flexible plastic substrate. In order to obtain a sealed surface, on both the front and rear of the substrate a structure, as shown in FIG. 14, is applied, wherein the structures are arranged displaced by the width of a finger upwards or downwards in relation to each other, so that they form an offset arrangement that overall can perform the function of a sealed surface, but with which eddy-current losses are minimized.

The invention may be summarized as a system for electrical transmission in the field of garments and a corresponding transmitter for this. Electrical circuits in garments are coupled with electrical devices and/or electrical circuits in other garments in a wireless manner, preferably inductively, wherein electrical energy is transmitted via the coupling. Preferably, energy transmission in both directions will be possible, wherein a distributed system results with sources and devices that can be coupled together. The efficiency of the inductive energy transmission is increased by regulation of the frequency, preferably using resonance. In addition, means for information transmission are proposed.

The invention claimed is:

1. A system for wireless transmission of electrical energy comprising
   at least a first induction element (12) that is connected to a primary circuit (P),
   and at least a second induction element (14) that is connected to a secondary circuit (S),
   in which the induction elements (12), (14) can move position in relation to each other and are able to be positioned so that they are magnetically coupled,
   wherein in the primary circuit (P) means (32) for supplying the first induction element (12) with an AC voltage are provided for,
   so that in the first induction element (12) a magnetic field is generated, wherein a voltage is induced in the secondary circuit (S) as a result of the magnetic coupling with the second induction element (14),
   characterized in that in the primary circuit (P) means for setting the frequency of the AC voltage are provided, wherein responsive to an information signal representative of a change in degree of magnetic coupling between the first and second induction elements and thus a corresponding change in resonance in the primary circuit (P), the AC voltage frequency setting means changes an excitation frequency of the AC voltage supplied to the first induction element to make specific use of the change in resonance resulting from positional or locational changes of the induction elements in relation to each other.

2. A system as claimed in claim 1, in which
   at least the primary circuit (P) is designed as a resonant circuit,
   and the frequency of the AC voltage is set so that an increase in voltage occurs on the induction element (12) as a result of an increase in resonance.

3. A system as claimed in claim 2, wherein the secondary voltage is regulated by changes in the frequency of the primary-side AC voltage.

4. A system as claimed in claim 1, in which means (38) for rectifying the induced voltage are provided in the secondary circuit (S).

5. A system as claimed in claim 1, in which
   controlled switching means (32, 38) are provided both in the primary circuit (P) and in the secondary circuit (S),
   in which the switching means (32, 38) can be triggered in such a way that they generate an AC voltage from a supplied DC voltage,
   and the switching means (32, 38), when triggered differently, work as synchronous rectifiers that rectify a supplied AC voltage.

6. A system as claimed in claim 1, in which
   the first induction element (12) is arranged on a first item,
   and the second induction element (14) is arranged on a second item,
   where the items can change their relative positions to each other,
   and where additional means (104) for wireless transmission of information between the items are provided.

7. A system as claimed in claim 6, in which the means for wireless transmission of information have at least a third and a fourth induction element (104), where the third and fourth induction elements are arranged and/or designed to be orthogonal to the first and second induction elements (12, 14).

8. A system as claimed in claim 6, in which
a first and a second electrically conductive surface is arranged on each of the first and second items,
in which the items can be positioned in such a way that the surfaces have a capacitive coupling.

9. A system as claimed in claim 8, in which the surfaces comprise longitudinal areas (106) that are electrically insulated from one another along their length, wherein the longitudinal areas (106) are electrically connected on at least one end.

10. A garment comprising:
an electrical circuit (46) with at least one connector (48, 50) for electrical connection of at least one electrical unit (62), characterized in that
the connector (48, 50) transmits in a wireless manner electrical energy and/or electrical signals to a corresponding further connector (64) on the electrical unit (62) and/or receives this from the electrical unit (62), in which the connector (48, 50) has means for inductive coupling (12, 58),
at least one receptacle (60) is provided for accommodating a wearable electrical device (62),
where the inductive coupling means includes an induction element (58) arranged in the area of the receptacle (60) in such a way that it is inductively coupled with a second induction element (64) mounted on the device (62),
responsive to the device (62) being held in the receptacle (60).

11. A garment as claimed in claim 10, in which the garment has at least one electrical lead (52) with which the connector (48, 50) is connected to other electrical devices (48, 50, 56).

12. A garment as claimed in claim 10, in which the garment (44) has electrical devices that have a fixed connection, in particular electrical devices (56) and/or energy stores (S).

13. A garment as claimed in claim 10, in which the induction element (76, 78, 80, 84) is a flat, mechanically flexible inductor.

14. A garment as claimed in claim 10, in which the induction element forms part of a transmission system.

15. A system of garments comprising:
at least two garments (44, 68), in which
at least one connector (50) for wireless transmission of electrical energy is provided on the first garment (44) at a minimum of one point,
and at least one second connector (70) for wireless transmission of electrical energy is provided on the second garment (68) at a minimum of one second point,
where the first and the second points are selected in such a way that when the garments (44, 68) are used the garments (44, 68) are arranged in such a way that the connectors (50, 70) have such relative position to each other that electrical energy can be transmitted between the connectors (50, 70), wherein each garment includes an electrical circuit (46) with at least one connector (48, 50) for electrical connection of at least one electrical unit (62), characterized in that the connector (48, 50) transmits in a wireless manner electrical energy and/or electrical signals to a corresponding further connector (64) on the electrical unit (62) and/or receives this from the electrical unit (62).

* * * * *